Patented June 8, 1926.

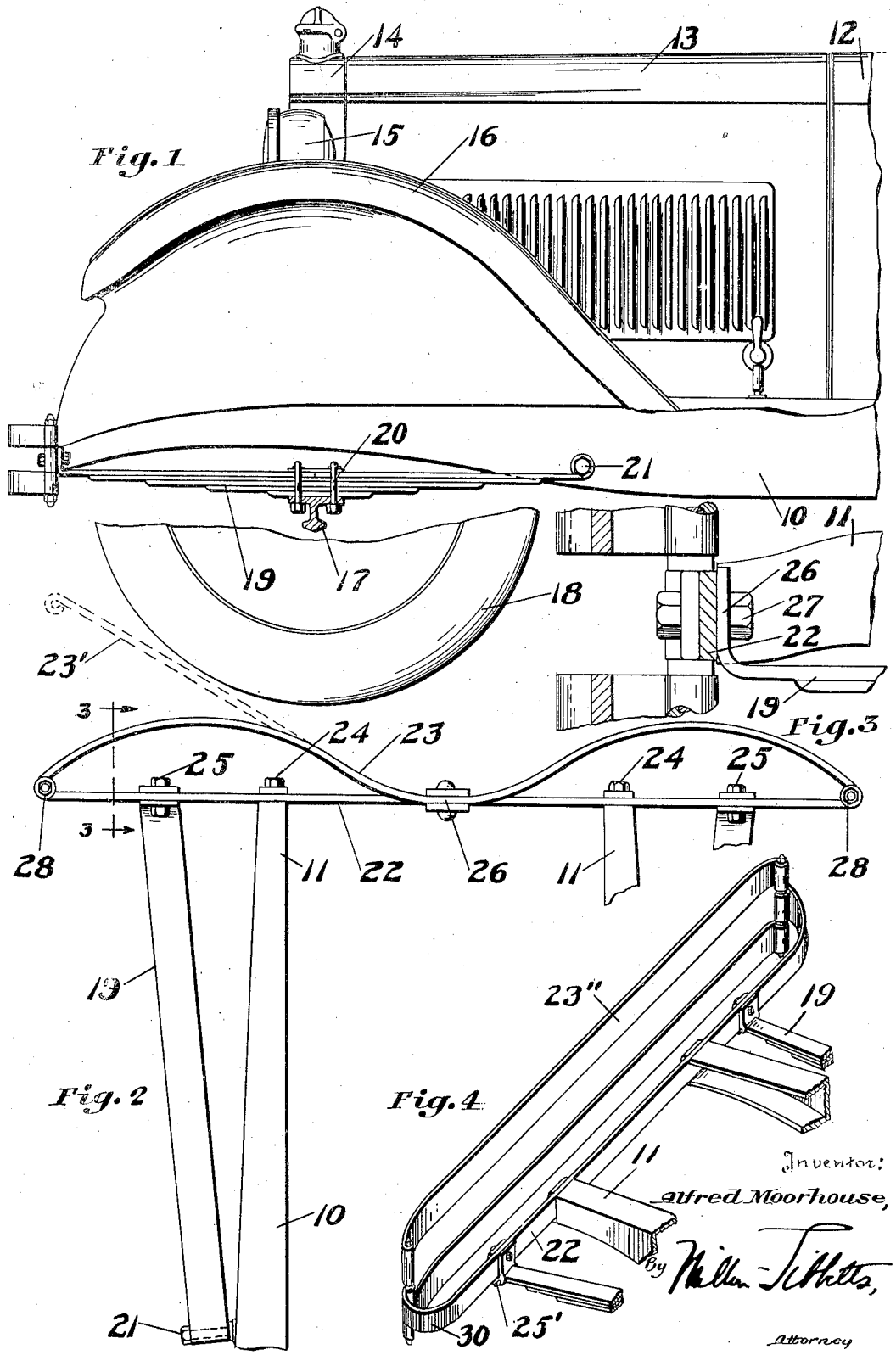

1,587,545

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 8, 1924. Serial No. 742,349.

This invention relates to motor vehicles and particularly to the chassis construction thereof.

One of the objects of the invention is to produce a strong and light vehicle.

Another object of the invention is to provide a simple and efficient spring and frame connection.

Another object of the invention is to provide a combination bumper and spring bracket of novel and improved form.

Other objects of the invention will appear from the following description taken in connection with the drawings, which form a part of this specification, and in which:—

Fig. 1 is a side elevation, partly in section, of the front portion of a motor vehicle embodying the invention;

Fig. 2 is a plan view of the front end of the frame and springs of the vehicle shown in Fig. 1, illustrating one form of the combination bumper and spring bracket;

Fig. 3 is a section substantially on the line 3—3 of Fig. 2, and

Fig. 4 is a perspective view of the front end of a frame and spring construction, illustrating another form of the combination bumper and spring bracket.

Referring to the drawings, 10 represents the chassis frame comprising the two side bars 11 as shown in the drawings. The front or cowl part of the body is shown at 12, the motor bonnet at 13, the radiator at 14, one of the lamps at 15 and the fender at 16. The front axle is indicated at 17 and one of the wheels is shown at 18 in Fig. 1. Connecting the axle 17 with the frame of the vehicle is a spring 19 of the usual leaf type. It is connected intermediate its ends to the axle 17 by clamps 20, in the usual way.

Spring shackles that become loose and noisy are completely done away with by this invention, the springs 19 being connected at their rear ends to the frame 10 by suitable pivots 21 and at their front ends by a novel form of flexible mounting which permits of sufficient flexibility without any wearing parts. This flexible mounting also forms a bumper at the front end of the vehicle and it is shown as comprising a bar 22 and one or more bars 23. This bumper extends crosswise of the frame and springs and its bar 22, which is preferably rather flexible, is connected as at 24 to the front ends of the frame side bars 11. The springs 19 extend substantially parallel to the side bars 11, somewhat outboard from them, and their forward ends are connected to the bar 22 as at 25. This connection is shown in some detail in Fig. 3 where it will be seen that the end of the spring is turned up as at 26 and a bolt 27 clamps the turned up end rigidly to the bar 22. If preferred, these springs may be connected to the bar 22 by a pivotal joint as shown at 25' in Fig. 4.

The flexible bar 22 extends beyond the springs 19 and its ends are connected by the bars 23 above referred to. In the form shown in Fig. 2 each of these bars 23 is connected at 26 to the middle portion of the bar 22, this being preferably a rigid connection. Each of the bars 23 if left free would assume the straight form shown in dotted lines at 23', in Fig. 2, but the assembly of the bar is completed by bending it into the full line position shown in Fig. 2 and connecting it to the outer ends of the bar 22, this connection being shown as a pivoted one at 28. By this arrangement the bars 23 assume a double oval shape which is of pleasing appearance and which properly positions it for acting as a bumper for the vehicle. The constant spring tension on the bars 23 causes a forward pull on the springs 19 thus tending to straighten them out, but of course the whole front mounting for the springs 19 is sufficiently flexible to give as the spring 19 is flexed in the operation of the vehicle.

In the form shown in Fig. 4 the outer ends of the bar 22 are curved as at 30 and these outer ends are connected by a pair of bars 23'' so that there is here also a tendency to pull the springs 19 forwardly and thus keep them in tension.

It will be understood that various forms of the invention other than those described above may be used without departing from the spirit or scope of the invention.

Having thus described my invention, what I claim and desire to secure by Letters Patent is:—

1. In a motor vehicle, the combination of a frame, an axle, a spring connected to the axle, a bumper extending crosswise of the frame and comprising a flexible bar connected to the frame and a second flexible bar connecting the ends of the first bar, and a connection between the spring and said bumper.

2. In a motor vehicle, the combination of a frame, an axle, a spring connected to the axle, a bumper extending crosswise of the frame and comprising a flexible bar connected to the frame and a second flexible bar connecting the ends of the first bar, and a connection between the spring and the first said flexible bar.

3. In a motor vehicle, the combination of a frame, an axle, a spring connected to the axle, a bumper extending crosswise of the frame and comprising a flexible bar connected to the frame and to the end of said spring, and a second flexible bar connecting the ends of the first bar.

4. In a motor vehicle, the combination of a frame, an axle, a spring connected to the axle and to the frame, and a bumper extending crosswise of the frame and comprising parallel flexible bars one of which is connected to the frame and to the spring and the other of which is disconnected from the frame and connects the ends of the first bar.

5. In a motor vehicle, the combination of a frame and a chassis spring, and a bumper connected to the frame and to said spring and comprising two bars one of which connects the ends of the other without connection to the frame or spring.

6. In a motor vehicle, the combination of a frame having side bars, an axle, springs secured to the axle, and a bracket for connecting the ends of the springs to the frame comprising a flexible bar connected to the springs and to the frame and extending beyond the springs, and a second flexible bar connecting the ends of the first bar independently of the frame and springs.

7. In a motor vehicle, the combination of a frame, an axle, a spring secured to the axle, and a flexible bumper connected to the frame and to one end of said spring, said connection between the bumper and the spring end being a rigid connection.

8. In a motor vehicle, the combination of a frame, a spring, a bracket connected to the frame and to the spring, and a spring device so connected to said bracket as to put longitudinal tension on said spring.

9. In a motor vehicle, the combination of a frame side bar, a spring arranged substantially parallel thereto, a bracket extending crosswise of the frame and spring and connected to the ends thereof, said bracket extending outwardly beyond the spring, and a spring device connected to said bracket so that it tends to yieldingly pull the spring lengthwise of the frame.

10. In a motor vehicle, the combination of a frame having side bars, springs adjacent the side bars, and a combination bumper and spring bracket comprising a bar extending crosswise of the frame and connecting the ends thereof and being connected to the ends of the springs, and a spring bar connecting the outer ends of said first bar independently of the frame.

11. In a motor vehicle, the combination of a frame having side bars, springs adjacent the side bars, and a combination bumper and spring bracket comprising a bar extending crosswise of the frame and connecting the ends thereof and being connected to the ends of the springs, and a spring bar connected to the middle portion of the first bar and to the outer ends thereof beyond the springs and independently of the frame.

In testimony whereof I affix my signature.

ALFRED MOORHOUSE.